(12) United States Patent
Mazet et al.

(10) Patent No.: US 10,107,138 B2
(45) Date of Patent: Oct. 23, 2018

(54) DEVICE FOR DE-ICING A LEADING EDGE OF A TURBINE ENGINE BY SLANTING NOTCHES

(71) Applicant: SNECMA, Paris (FR)

(72) Inventors: Hélène Mazet, Moissy-Cramayel (FR); Morgan Balland, Moissy-Cramayel (FR); Jean-Yves Picart, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 579 days.

(21) Appl. No.: 14/103,360

(22) Filed: Dec. 11, 2013

(65) Prior Publication Data
US 2014/0205427 A1    Jul. 24, 2014

(30) Foreign Application Priority Data

Dec. 11, 2012 (FR) .................................... 12 61865

(51) Int. Cl.
*F01D 25/02* (2006.01)
*F02C 7/047* (2006.01)

(52) U.S. Cl.
CPC .............. *F01D 25/02* (2013.01); *F02C 7/047* (2013.01); *F05D 2260/221* (2013.01)

(58) Field of Classification Search
CPC ..... F01D 25/02; F05D 2260/221; F02C 7/047
See application file for complete search history.

(56) References Cited

U.S. PATENT DOCUMENTS

| 5,088,277 | A | * | 2/1992 | Schulze | B64D 15/04 244/134 R |
| 6,561,760 | B2 | * | 5/2003 | Wadia | F01D 25/02 415/145 |
| 6,585,191 | B2 | * | 7/2003 | Andre | B64D 15/04 244/134 B |
| 8,061,657 | B2 | * | 11/2011 | Rocklin | B64D 15/04 138/116 |
| 2003/0035719 | A1 | | 2/2003 | Wadia et al. | |

FOREIGN PATENT DOCUMENTS

EP        2 075 194        7/2009

OTHER PUBLICATIONS

Search Report and Written Opinion as issued for French Patent Application No. 1261865, dated Sep. 18, 2013.

* cited by examiner

*Primary Examiner* — Woody Lee, Jr.
*Assistant Examiner* — Juan G Flores
(74) *Attorney, Agent, or Firm* — Pillsbury Winthrop Shaw Pittman LLP

(57) ABSTRACT

A device for de-icing a wall of a leading edge of a turbine engine, the leading edge being adapted to cooperate with a downstream guide vane subjected to a flow of fluid, the device including: a first fluid flow device provided along an upper zone of the downstream guide vane so as to guide the fluid to the wall of the leading edge, and a second fluid flow device provided along a lower zone of the downstream guide vane so as to evacuate the fluid from the leading edge, wherein the first fluid flow device is arranged such that the wall of the leading edge is impacted by the fluid along a non-orthogonal direction.

18 Claims, 3 Drawing Sheets

DEVICE FOR DE-ICING A LEADING EDGE OF A TURBINE ENGINE BY SLANTING NOTCHES

CROSS REFERENCE TO RELATED APPLICATIONS

This application claims the benefit of priority from French Patent Application No. 1261865 filed on Dec. 11, 2012, the entire content of which is incorporated herein by reference.

FIELD

The present invention relates to a device for de-icing a leading edge of a turbine engine, and more particularly a flow separator. The technical field of the invention is that of pneumatic de-icing devices.

BACKGROUND

In certain phases of flight (ascent, descent, etc.), atmospheric conditions known as "icing" may be encountered if the ambient temperature becomes lower or equal to zero degrees Celsius. These conditions can lead to deposits of ice on certain parts of the engine, particularly on the flow separator. The flow separator is an instrument that makes it possible to split the air admitted into the engine into a primary flow and a secondary flow. It is particularly adapted to cooperate with a downstream guide vane bringing the flow of air into the axis of the engine.

Among the de-icing systems known from the prior art, three main categories of systems may be distinguished: pneumatic de-icing systems, electrical de-icing systems, and oil circulation de-icing systems. In pneumatic de-icing systems, one takes air that has been compressed, and thus heated, from a high pressure compressor. This air is injected near to the parts of the engine to be de-iced. The principle consists in guaranteeing a sufficiently high temperature on the zone to be de-iced so as to prevent the formation of ice.

A device for de-icing a separator by a system of notches is known. A separator 100 of a turbine engine 101 cooperating with a downstream guide vane 102 is illustrated in FIGS. 1 and 2 along a sectional view.

The device comprises:
- a plurality of upper grooves 103 spread out circumferentially and machined in an upper zone 104 of the downstream guide vane 102, parallel to the engine axis X. An upper groove 103 is represented in perspective in FIG. 3,
- a plurality of lower notches 105 spread out circumferentially and machined in the separator 100, orthogonally to the engine axis X.

It may be noted that the upper grooves 103 and the lower notches 105 belong to different planes: they are offset angularly with respect to each other.

The upper zone 104 of the downstream guide vane 102 is subjected to air flows 106 at high temperature coming from injectors (not represented). Each air flow 106 is guided via an upper groove 103 to a circular wall 107 of the separator 100. Since the upper grooves 103 are parallel to the engine axis X, the wall 107 is impacted orthogonally by the air flow 106. Each air flow 106 is thus substantially divided into two semi-flows of air 108 during the impact on the wall 107.

The semi-flows of air 108 then circulate along the wall 107 in azimuthal directions through the axial clearance between the wall 107 and the downstream guide vane 102. Finally, the semi-flows of air 108 are evacuated from the separator 100 via the lower notches 105. The upper grooves 103 and lower notches 105 thereby participate in an air flow circuit heating the wall 107 thereby enabling its de-icing.

This device nevertheless has a drawback. The thermal profile of the separator is saw tooth like, in particular when its thermal conductivity is low, for example for a titanium separator. In fact, since the grooves through which the hot air passes are spread out circumferentially, the thermal profile exhibits temperature peaks at the level of the grooves, and temperature wells between two grooves. A conventional profile is illustrated in FIG. 4, representing the temperature T of the tip 109 of the separator 100 on a portion situated between two upper grooves 103, in a case of conventional dimensioning in icing conditions.

To minimise temperature wells, a solution consists in increasing the air flow rate. However, this solution involves constraints at the level of the distribution system and leads to a loss of consumption. Another solution consists in reducing the section of the clearance between grooves. However, this reduction is restricted by the limits of the tooling.

SUMMARY

An aspect of the invention relates to a device for de-icing a flow separator of a turbine engine, or more generally of a leading edge of a turbine engine, making it possible to avoid or at least limit temperature wells or hollows.

An embodiment of the invention thus relates to a device for de-icing a wall of a leading edge of a turbine engine, the leading edge being adapted to cooperate with a downstream guide vane subjected to a flow of fluid, the device comprising:
- a first fluid flow device along an upper zone of the downstream guide vane so as to guide the fluid to the wall of the leading edge,
- a second fluid flow device along a lower zone of the downstream guide vane so as to evacuate the fluid from the leading edge, wherein the first fluid flow device is arranged such that the wall of the leading edge is impacted by the fluid along a non-orthogonal direction.

In accordance with an embodiment of the invention, the flow rate impacting the wall to be de-iced is not separated into two during impact. The flow rate circulating along the wall is thereby greater, which has the effect of smoothing out the temperature profile of the wall. In addition, the surface of the wall bathed by the jet effect is also greater.

Apart from the characteristics that have been mentioned in the preceding paragraph, the device according to an embodiment of the invention may have one or more complementary characteristics among the following, considered individually or according to any technically possible combinations thereof:
- the first fluid flow device comprises an upper groove formed in the upper zone of the downstream guide vane,
- the first fluid flow device comprises an upper notch formed in the leading edge, the fluid impacts the wall of the leading edge according to an angle greater than ten degrees,
- the fluid impacts the wall of the leading edge according to an angle comprised between thirty and sixty degrees,
- the second fluid flow device is formed by the clearance between the lower zone of the downstream guide vane and the leading edge, the second fluid flow device comprises a lower groove formed in the lower zone of the downstream guide vane, the second fluid flow device comprises a lower notch formed in the leading edge.

An aspect of the invention also relates to a turbine engine comprising a device as described previously.

An embodiment of the invention also relates to the use of a device as described previously to de-ice a flow separator cooperating with a downstream guide vane. The leading edge is then the flow separator.

Embodiments of the invention and their different applications will be better understood on reading the description that follows and by examining the figures that accompany it.

BRIEF DESCRIPTION OF DRAWINGS

The FIGURES are only presented for indicative purposes and in no way limit the invention. The FIGURES show:

in FIG. 5b, a perspective view of an upper groove of FIG. 5a;

DETAILED DESCRIPTION

Figure 1:
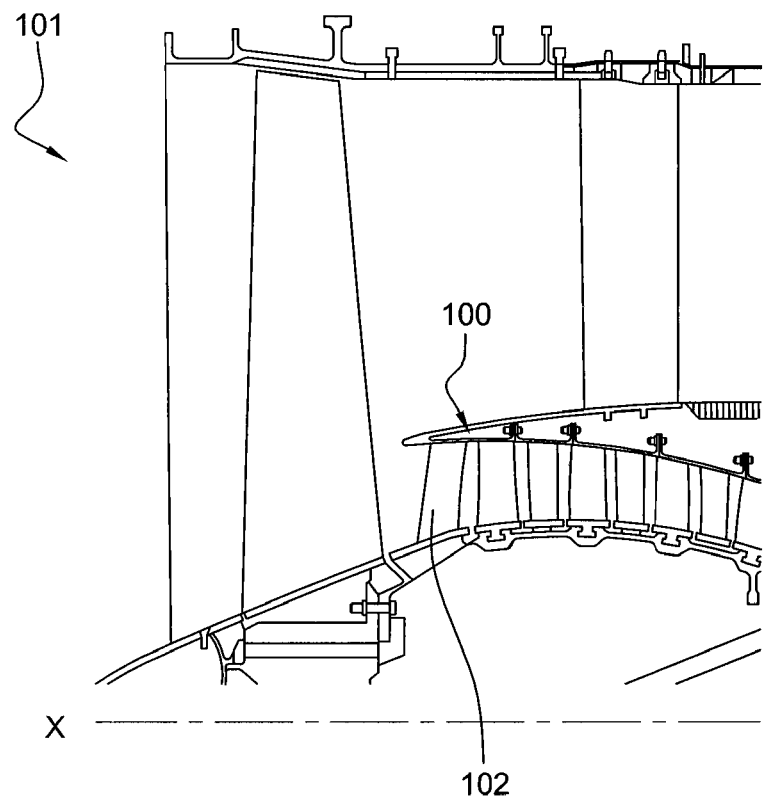
in FIG. 1, already described, a schematic representation of a turbine engine comprising a flow separator.
Figure 2:
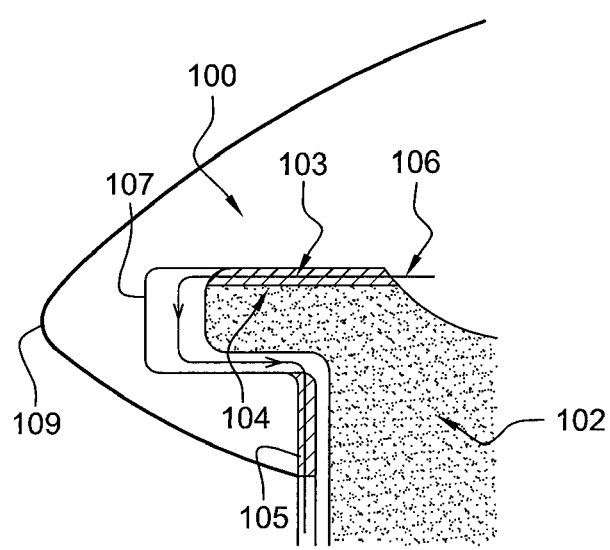
in FIG. 2, already described, a sectional view of a device for de-icing a flow separator cooperating with a downstream guide vane, according to the prior art.
Figure 3:
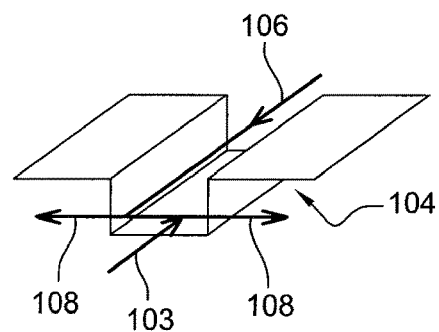
in FIG. 3, already described, a perspective view of an upper groove formed on the downstream guide vane of FIG. 2.
Figure 4:
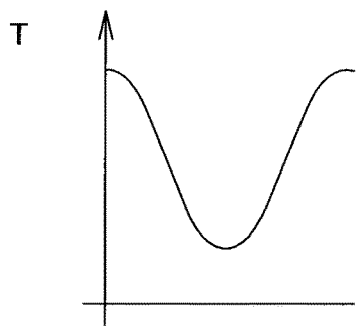
in FIG. 4, already described, a graph representing the thermal profile of the flow separator of FIG. 2.

Unless specified otherwise, a same element appearing in the different figures has a unique reference.

The device according to an embodiment of the invention is used to de-ice a leading edge of a turbine engine 101, for example a flow separator 100 as presented in the detailed embodiment. The flow separator 100 cooperates conventionally with a downstream guide vane 102. In fact it comprises a place adapted to receive a downstream guide vane head 102. The downstream guide vane 102 is subjected to flows of fluid 206 at high temperature, for example air taken from high pressure compressors, intended to heat the separator.

Figure 5B:
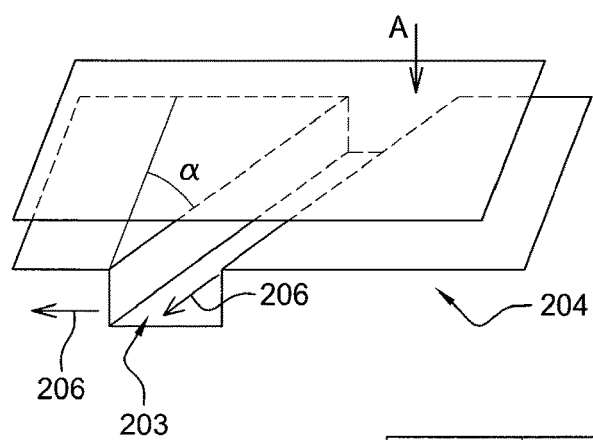
Figure 6:
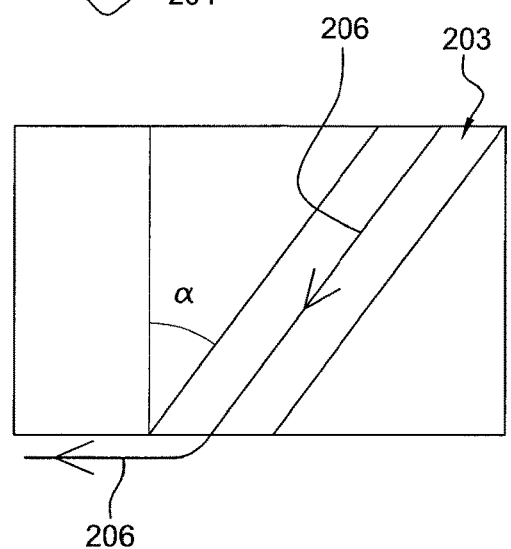
in FIG. 6, a top view of the upper groove of FIG. 5b.
Figure 5A:
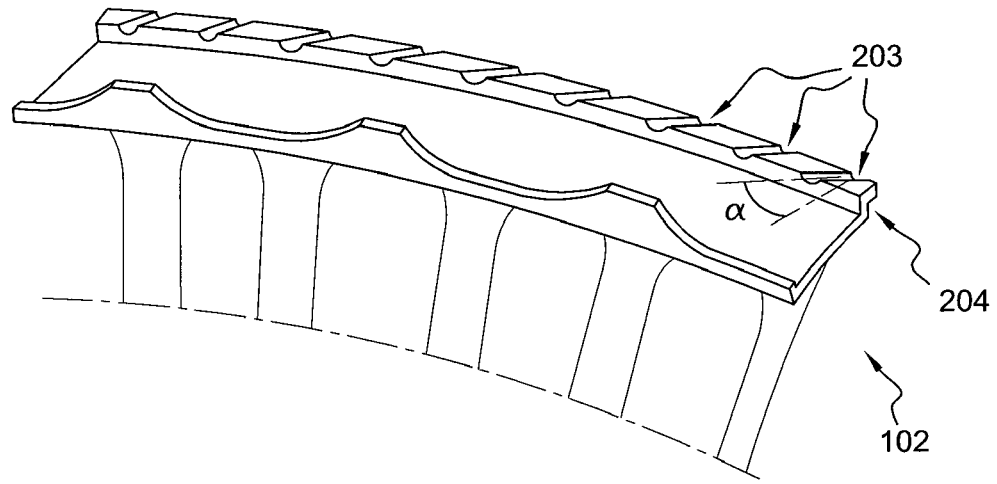
in FIG. 5a, a schematic representation of a plurality of upper grooves formed on a downstream guide vane intended to cooperate with a flow separator adapted to be de-iced by a de-icing device according to an embodiment of the invention.

The de-icing device comprises:

a first fluid flow device or arrangement 203 along an upper zone 204 of the downstream guide vane head 102 so as to guide the fluid to a wall 107 of the leading edge, the wall 107 being circular and arranged, in the non-limiting embodiment described, orthogonally to the engine axis X. In an embodiment, the first flow device 203 comprises a plurality of upper grooves formed in the upper zone 204 of the downstream guide vane head, and spread out circumferentially. In another embodiment, the first flow device 203 comprises a plurality of upper notches formed in the separator 100 and spread out circumferentially. In addition, the first flow device 203 is arranged such that the wall 107 of the separator 100 is impacted by the fluid along a non-orthogonal direction. Thus, the upper notches or upper grooves 203 are not formed parallel to the engine axis X of the turbine engine 101, but with a certain angle $\alpha$. More precisely, the angle $\alpha$ indicates the slant between the first flow device 203 and an axis parallel to the engine axis X. FIGS. 5a, 5b and 6 illustrate an embodiment in which the first flow device 203 comprises a plurality of upper grooves. FIG. 5a shows a downstream guide vane 102 comprising an upper zone 204 along which a plurality of upper grooves 203 according to an embodiment of the invention are formed. The upper grooves 203 are spread out circumferentially on the head of the downstream guide vane 102. FIGS. 5b and 6 schematically show one of these upper grooves 203. FIG. 5b shows an upper groove 203 according to a perspective view, and FIG. 6 shows the upper groove 203a in a top view with respect to a plane A.

a second fluid flow device or arrangement 105 along a lower zone of the downstream guide vane 102 so as to evacuate the fluid from the separator 100. In an embodiment, the second fluid flow device 105 comprises a plurality of lower grooves formed in the lower zone of the downstream guide vane head 102, spread out circumferentially and orthogonally to the engine axis X. In another embodiment, the second flow device 105 comprises a plurality of lower notches formed in the separator 100, spread out circumferentially and orthogonally to the engine axis X. In an alternative embodiment, the second flow device 105 is formed by the clearance between the lower zone of the downstream guide vane 102 and the separator 100.

The circulation path of the flows of fluid 206 is the following: each flow of fluid 206 is guided via an upper notch or an upper groove 203 to the wall 107. Since the upper notches or upper grooves 203 are arranged with an angle $\alpha$ with respect to the engine axis X, the flow rate of each upper notch or upper groove 203 is not separated into two during the impact of the fluid on the wall 107.

Each flow of fluid 206 then circulates along the wall 107 in azimuthal directions through the axial clearance between the wall 107 and the downstream guide vane 102. Finally, the flows of fluid 206 are evacuated from the separator 100 via the lower notches or the lower grooves 105, arranged such that the surface bathed by the jet effect is the greatest possible. To do so, the notches or lower grooves 105 are each offset angularly over the circumference of the separator 100, with respect to the prior art. The notches or upper 206 and lower 105 grooves thereby participate in a fluid flow circuit heating the wall 107 and enabling its de-icing.

The device with slanting upper notches or upper grooves 203 has two benefits making it possible to smooth out the temperature difference between two upper notches or upper grooves 203 without having to increase the flow rate of fluid:

the surface bathed by the jet effect is greater;

the local exchange coefficient being proportional to the ratio $$\left(\frac{Q}{S}\right)^{0.8},$$

where Q is the flow rate passing via the section S in an axial plane, and the flow rate of each upper notch or upper groove 203 not being separated into two during the impact with the wall 107 to be de-iced, the local exchange coefficient is higher between each notch or upper groove 203.

The invention claimed is:

1. A device for de-icing a wall of a leading edge of a turbine engine, said leading edge being adapted to cooperate with a downstream guide vane subjected to a flow of fluid, the device comprising:
a first fluid flow device provided along an upper zone of the downstream guide vane, the first fluid flow device extending along a longitudinal axis so as to guide the fluid, along said longitudinal axis, to the wall of the leading edge,
a second fluid flow device provided along a lower zone of the downstream guide vane so as to evacuate the fluid from the leading edge,
wherein said longitudinal axis is non-orthogonal to the wall such that the fluid flowing to the wall along the longitudinal axis in said first fluid flow device is deflected by the wall in a same azimuthal direction and circulates along the wall in said azimuthal direction through an axial clearance between the wall and the downstream guide vane.

2. The de-icing device according to claim 1, wherein the first fluid flow device comprises an upper groove formed in the upper zone of the downstream guide vane.

3. The de-icing device according to claim 2, wherein the upper groove extends along a groove axis that is non-orthogonal to the wall such that the fluid flowing to the wall along said groove axis is deflected by said wall in the azimuthal direction and circulates along the wall in said azimuthal direction through the axial clearance between the wall and the downstream guide vane.

4. The de-icing device according to claim 2, wherein the fluid flowing through the upper groove remains undivided after interacting with the wall.

5. The de-icing device according to claim 1, wherein the fluid impacts the wall of the leading edge according to an angle ($\alpha$) between the longitudinal axis in said first fluid flow device and a longitudinal axis of the turbine engine greater than ten degrees.

6. The de-icing device according to claim 1, wherein the fluid impacts the wall of the leading edge according to an angle comprised between thirty and sixty degrees.

7. The de-icing device according to claim 1, wherein the second fluid flow device is formed by the clearance between the lower zone of the downstream guide vane and the leading edge.

8. The de-icing device according to claim 1, wherein the second fluid flow device comprises a lower notch formed in the leading edge.

9. A turbine engine comprising a de-icing device according to claim 1.

10. A method comprising de-icing a flow separator cooperating with a downstream guide vane with a de-icing device according to claim 1.

11. The de-icing device according to claim 1, wherein the fluid impacts the wall of the leading edge according to an angle ($\alpha$) between the longitudinal axis in said first fluid flow device and a longitudinal axis of the turbine engine and said angle ($\alpha$) is selected to prevent a flow of the fluid impacting the wall of the leading edge from splitting into two opposite directions.

12. A device for de-icing a wall of a leading edge of a turbine engine, said leading edge being adapted to cooperate with a downstream guide vane subjected to a flow of fluid, the device comprising:
a first fluid flow device including a plurality of grooves formed in an upper zone of the downstream guide vane, each of said grooves configured to guide the fluid to the wall of the leading edge so that said fluid interacts with said wall, said wall being oriented orthogonally to a longitudinal axis of the turbine engine, and
a second fluid flow device provided along a lower zone of the downstream guide vane so as to evacuate the fluid from the leading edge,
wherein each of the grooves of the first fluid flow device extends along a groove axis that is non-orthogonal to the wall such that all the fluid flowing to the wall along said groove axis is deflected by said wall in a same azimuthal direction and circulates along the wall in said azimuthal direction through an axial clearance between the wall and the downstream guide vane.

13. The de-icing device according to claim 12, wherein the wall is circular.

14. The de-icing device according to claim 12, wherein the second fluid flow device comprises a lower notch formed in the leading edge.

15. The de-icing device according to claim 12, wherein an angle between the groove axis of each of the grooves and a direction perpendicular to the wall is greater than ten degrees.

16. The de-icing device according to claim 15, wherein the angle is between thirty and sixty degrees.

17. The de-icing device according to claim 12, wherein the first fluid flow device includes a plurality of grooves formed in the upper zone of the downstream guide vane, each of said grooves extending along a groove axis parallel to the longitudinal axis and being configured to guide the fluid to the wall of the leading edge, and wherein, for each of the plurality of grooves, the groove axis is oriented relative to a direction perpendicular to said wall at a same angle greater than 10 degrees.

18. The de-icing device according to claim 12, wherein, for each of the plurality of grooves, the groove axis is oriented relative to a direction perpendicular to said wall at a same angle greater than 10 degrees.

* * * * *